(12) United States Patent  (10) Patent No.: US 9,118,146 B2
Schulz et al.  (45) Date of Patent: Aug. 25, 2015

(54) PLUG-IN COUPLED DEVICE FOR PROVIDING COMMANDS AND/OR SIGNALS

(71) Applicant: R. STAHL Schaltgerate GmbH, Waldenburg (DE)

(72) Inventors: Berthold Schulz, Schontal (DE); Steffen Buhl, Schwabisch Hall (DE)

(73) Assignee: R. STAHL Schaltgerate GmbH, Waldenburg (DE)

( * ) Notice: Subject to any disclaimer, the term of this patent is extended or adjusted under 35 U.S.C. 154(b) by 3 days.

(21) Appl. No.: 14/219,459

(22) Filed: Mar. 19, 2014

(65) Prior Publication Data

US 2014/0287613 A1    Sep. 25, 2014

(30) Foreign Application Priority Data

Mar. 20, 2013 (DE) .......................... 10 2013 102 860

(51) Int. Cl.
  *H02G 3/18* (2006.01)
  *H05K 5/00* (2006.01)
  *H05K 7/00* (2006.01)
  *H01R 13/627* (2006.01)
  *H02B 1/044* (2006.01)

(52) U.S. Cl.
  CPC ............ *H01R 13/6277* (2013.01); *H02B 1/044* (2013.01)

(58) Field of Classification Search
  CPC ... G02B 6/3816; D06F 39/005; H01H 19/025
  USPC ............... 361/679.01–679.09, 679.1–679.19, 361/679.21–679.29, 679.31–679.45, 361/679.55–679.6, 724–747; 174/650–669
  See application file for complete search history.

(56) References Cited

U.S. PATENT DOCUMENTS

2008/0289940 A1*  11/2008  Kim et al. .................... 200/336
2009/0148102 A1*  6/2009  Lu et al. ......................... 385/60

* cited by examiner

*Primary Examiner* — Jerry Wu

(74) *Attorney, Agent, or Firm* — Leydig, Voit & Mayer, Ltd.

(57) ABSTRACT

A plug-in device (10) for providing commands and/or signals comprising an attachment part (12), an adaptor (22), and at least one command or notification device (30). The device (10) includes a plug-in rotary coupling for connecting the adaptor and attachment part in response to relative rotational movement about an axial direction (A). For locking the coupling, a locking web (62) is provided for engagement and disengagement by a locking coupling web (88) in response to relative rotation of the adaptor (22) and attachment part (12). A catch lock further is provided that includes a catch (68) arranged on a plug-in appendage (42 and a counter catch (90, 92) that are engageable by relative rotation of the adapter (22) and the attachment part (12).

15 Claims, 6 Drawing Sheets

PLUG-IN COUPLED DEVICE FOR PROVIDING COMMANDS AND/OR SIGNALS

FIELD OF THE INVENTION

The subject invention relates to devices for providing commands and/or signals comprising an attachment part and an adapter, which is equipped to accommodate at least one command and/or notification device.

BACKGROUND OF THE INVENTION

Devices for giving commands, such as buttons or switches and devices for giving signals, such as signal lamps, for example, are known, which are arranged in operating panels. With these, parts of an electrical installation can be controlled or information can be received. The operating panel can be embodied as door for a control box, for example. Such devices, which serve to give commands and/or signals, in each case encompass an attachment part, which can include a push button and/or a signal lamp, for example. The attachment part is inserted into a recess or into a hole in the operating panel and is screwed to the rear side of the operating panel with the help of a screw nut.

A command device (switch) is operated by means of the button, which is arranged in the device. A signaling device includes a lamp or a buzzer, e.g., as notification device. The command or notification devices are connected to the attachment part on the rear side of the control panel.

It may be desirable to operate a plurality of switches with a single attachment part. For flexibility reasons, it is desirable for individual switches to be capable of being removed from the attachment part and to be capable of being replaced with other modules. This is why such devices can include an adapter, which is arranged on the rear side of the operating panel at the attachment part. One or a plurality of switches can be fastened to the adapter, which allows for an easy replacement of said switches.

A device comprising such an adapter is known, for example, from the data sheet "TECHNOR HarmAtex", which can be accessed via the web address http://ex.technor.com/. The attachment part of the device illustrated on page 2 has two grooves, which are located on opposite sides. The adapter is configured of two parts. It encompasses a frame made of plastic and a metal clamp. The adapter can be attached to the attachment part, wherein the metal clamp is engaged with the grooves for locking purposes.

A further device is illustrated in the catalog "Conrad Business 2013-Volume 1" on page 618. The adapter has a rotary slide made of metal, which can be moved rotationally relative to the adapter, which is otherwise made of plastic. The push button encompasses plug-in appendages, which define an axial direction and on which projections are arranged, which form undercuts. The adapter is attached to the push button. The rotary slide is rotated relative to the remaining adapter part and the push button and is thus engaged with the undercuts for embodying an axial lock.

Attachment parts, adapters and contact elements of a further device are illustrated in the catalog "Conrad Business 2013-Volume 1" on page 614. The fastening adapter encompasses a frame, in each case comprising long and short sides, which are located opposite one another. A detent is embodied at a resilient cross beam between the two long sides. A second detent is arranged opposite to the detent of the resilient cross beam. On opposite sides, the attachment part encompasses grooves. The fastening adapter is attached to the attachment part and the detents are thus engaged with the grooves.

OBJECT AND SUMMARY OF THE INVENTION

It is an object of the invention to provide a device of the foregoing type having a simplified locking mechanism between the adapter and the attachment part.

The subject device includes an attachment part which can be a command and/or signal attachment, or which can be equipped to accommodate such a command and/or signal attachment. The command and/or signal attachment, for example, can include a button and/or an illuminated window. The device further encompasses an adapter and at least one command and/or notification device, hereinbelow synonymously also called a switch. The adapter is equipped to accommodate the at least one switch. The device encompasses a plug-in coupling, which is embodied at the adapter and the attachment part and which is equipped to connect the adapter to the attachment part. The plug-in coupling encompasses a first coupling means comprising one or a plurality of plug-in appendages and a second, accommodating coupling means. Preferably, no further couplings means are present. The relative plug-in movement of the adapter and of the attachment part in response to the connection defines an axial direction.

A locking device comprising a locking surface, which is oriented transversely, for example vertically, to the axial direction at the first coupling means is associated with the plug-in coupling. The locking device further encompasses a counter locking surface, which is arranged at the second coupling means so as to be oriented transversely, for example vertically, to the axial direction. The locking surface or the counter locking surface, respectively, is preferably formed by a side surface, which is oriented transversely, for example vertically, to the axial direction, of a locking web or counter locking web, respectively, which is oriented transversely, for example vertically, to the axial direction. The locking surface and the counter locking surface are arranged such that they can be brought into and out of engagement by means of the relative rotation of the adapter and of the attachment part to one another about the axial direction. The surfaces are thereby shifted against one another, preferably parallel against one another. The rotary movement, which is necessary for this, preferably passes over an angle of less than 90°, wherein an angle of less than 20° is particularly preferred. The rotary movement for locking preferably takes place in clockwise direction.

A web, which is arranged at a coupling means, forms an undercut for the assigned web of the other coupling means. The axial separation of the adapter and of the attachment part is blocked through this. The locking device can encompass a plurality of locking surfaces and counter locking surfaces or a plurality of locking webs and counter locking webs, respectively. Pushing together excessively in axial direction is preferably also not possible due to a plug-in stop, that is, the webs define a desired axial position of the coupling means with a high accuracy. Pushing excessively when adapter and attachment part are not yet rotationally locked and/or when adapter and attachment part are already rotationally locked, can be prevented by means of the plug-in stop. The plug-in stop is formed by means of a first plug-in stop wall, which is arranged at the first coupling means, and by a second plug-in stop wall, which is arranged at the second coupling means.

Preferably, the adapter is connected to the attachment part by means of the locking device and the plug-in stop without axial play in the context of the forces, which occur during normal operation.

The plug-in coupling further encompasses a catch lock comprising at least one catch means and at least one counter catch means. The catch means is arranged at the first coupling means, for example at the plug-in appendage. A counter catch means, which is assigned to the catch means, is arranged at the second coupling means. Exactly one counter catch means can be assigned to each catch means. In the alternative, a catch means can be capable of being locked in place with a counter catch means from a group of counter catch means. The catch means and the counter catch means are arranged such that, for locking purposes, they can be engaged by means of a relative rotation of the adapter and of the attachment part about the axial direction. The locking by means of the catch lock blocks a rotation of the adapter and of the attachment part relative to one another about the axial direction. The catch lock blocks a rotary movement of the adapter and of the attachment part about the axial direction, which would lead to an undesired unlocking of the axial lock. The blocking signifies at least that a torque, which is larger than the torque, which appears during normal operation on the attachment part and the adapter, must be applied for overcoming the catch lock, or that a detent is to be released.

If provision is made for a detent, wherein a provision is preferably made for a single detent, the catch lock cannot be released by overcoming a release torque. The detent acts like a catch lock, that is, it completely blocks a rotary movement opposite to the rotary locking movement. For example, the detent can be embodied such that it can be unlocked by means of a bending movement of one or a plurality of plug-in appendages. For this purpose, provision can be made in the part, which supports the second coupling means, for an unlocking opening.

The catch means and/or the counter catch means can be a catch projection, for example a rounded catch cam, a detent or a catch web. Preferably, the catch means and/or the counter catch means, may be a component, for example as surface structure, of the first or second coupling means, respectively, connected thereto in one piece, that is seamlessly, and are embodied from the same material, e.g. plastic.

The first and/or the second coupling means can encompass one or a plurality of rotary stops, which prevent an excessive rotary movement for locking. An excessive rotation in the direction of rotation is blocked by means of a rotary stop, which leads to a coupling of the locking surface and of the counter locking surface. The rotary stop is formed by means of a first rotary stop wall, which is arranged at the first coupling means, and a second rotary stop wall, which is arranged at the second coupling means. The rotary stop walls are preferably oriented parallel to the axial direction. For example, the adapter encompasses a rotary stop web comprising a rotary stop wall, which is arranged downstream from the catch means or the counter catch means, respectively, in the direction of rotation.

The attachment part accommodates a command and/or notification attachment, e.g. a switch, or is equipped to accommodate such a command and/or notification attachment. The attachment part can be equipped to be mounted into an operating or switch panel. For this purpose, a flange, which rests against the outer side of the operating panel, for example, in the installed state, can be arranged at the attachment part. Regardless of the use of the attachment part, the attachment part can include an external thread for a screw nut.

The adapter is equipped to accommodate one or a plurality of switches. For this purpose, recesses, edges, holes, boreholes comprising an internal thread, clamps or other fastening elements are located at the adapter. For example, V-shaped recesses can be arranged on one side of the outer edge, while the opposite side includes an edge. Preferably, no movable parts are located at the adapter. Preferably, the adapter is embodied so as to be rigid, that is, so as not to be resilient in the context of its function.

Preferably, the first coupling means is arranged at the attachment part, while the second coupling part is arranged at the adapter. The allocation can also be made vice versa.

Preferably, the first coupling means is part of the attachment part and is connected thereto in one piece, that is, seamlessly. Preferably, the adapter is also embodied in one piece, wherein the second coupling means is a one-piece part of the adapter.

The first coupling means can encompass a plurality, for example, four axial plug-in appendages. They can be arranged on a common, rectangular or circular circumference at the same or at different distances to one another. One plug-in appendage can be embodied as ring segment (or also as full ring), for example. One plug-in appendage, or at least sections thereof, can have a radial flexible spring characteristic.

The second coupling means is embodied to accommodate the plug-in appendage or appendages. For example, a round or circular recess for accommodating the plug-in appendages can be embodied at the second coupling means. The second coupling means can encompass a guide, along which parts of the first coupling means, for example the plug-in appendages, are displaceably guided in axial direction. Preferably, the accommodation of the second coupling means for the first coupling means is embodied such that the first and second coupling means and thus the attachment part and the adapter, are held immovably relative to one another, at least in the locked state, transversely to the axial direction.

In a preferred embodiment, the second coupling means is a recess in a frame, which forms the adapter. Preferably, the frame is rigid and does not encompass any movable parts. Preferably, one or plurality of counter locking webs and one or a plurality of counter catch means are arranged at the inner wall, which defines the recess, as surface structure of the inner wall.

A locking web is arranged at a plug-in appendage, e.g., at a different part of the first coupling means. At a joint, a plug-in appendage is connected to the element, which supports it, that is, the attachment part or the adapter, e.g. in one piece. The locking web can be located on the plug-in appendage, for example, at the joint or at an axial distance therefrom. The locking web can extend in circumferential direction across the entire plug-in appendage, which is embodied as finger, tongue, ring segment or ring, for example, or only across a part of the circumference.

Preferably, the locking web or the counter locking web, respectively, is immovable relative to the attachment part or adapter, respectively, which supports the locking web or the counter locking web, respectively. The locking web can be embodied as part, for example as surface structure, of the first coupling means or of the attachment part or adapter, respectively, which supports the first coupling means, in one piece, that is, seamlessly, therewith. The counter locking web, which is arranged at the second coupling means, can also be embodied as part, for example as surface structure, of the second coupling means or of the attachment part or adapter, respectively, in one piece, that is, seamlessly therewith.

Preferably, the webs of the locking device and the catch lock are functional sections, which are separate from one another. In particular, the catch means or counter catch means are preferably not arranged on or at a web or projection or in a groove of the locking device. Preferably, the catch lock is embodied such that it does not absorb forces in axial direction. Instead, the axial forces are preferably absorbed solely by the locking device.

The catch means and/or the counter catch means can be embodied and held rigidly, that is immovably or at least so as not to be resilient. If the element, which supports the counter catch means, is embodied so as to be rigid, the catch means can be arranged at the end of the plug-in appendage, which is located at a distance from the joint and which is slightly resilient. The plug-in appendage can form a flexible spring.

Preferably, the attachment part and/or the adapter consist of plastic or metal. Preferably, the adapter and/or the attachment part are in each case made of a single material, for example entirely from plastic.

Other objects and advantages of the invention will become apparent upon reading the following detailed description and upon reference to the drawings, in which:

BRIEF DESCRIPTION OF THE DRAWINGS

FIG. 2b is an enlarged fragmentary perspective of the attachment part shown in FIG. 2a;

Figure 1:
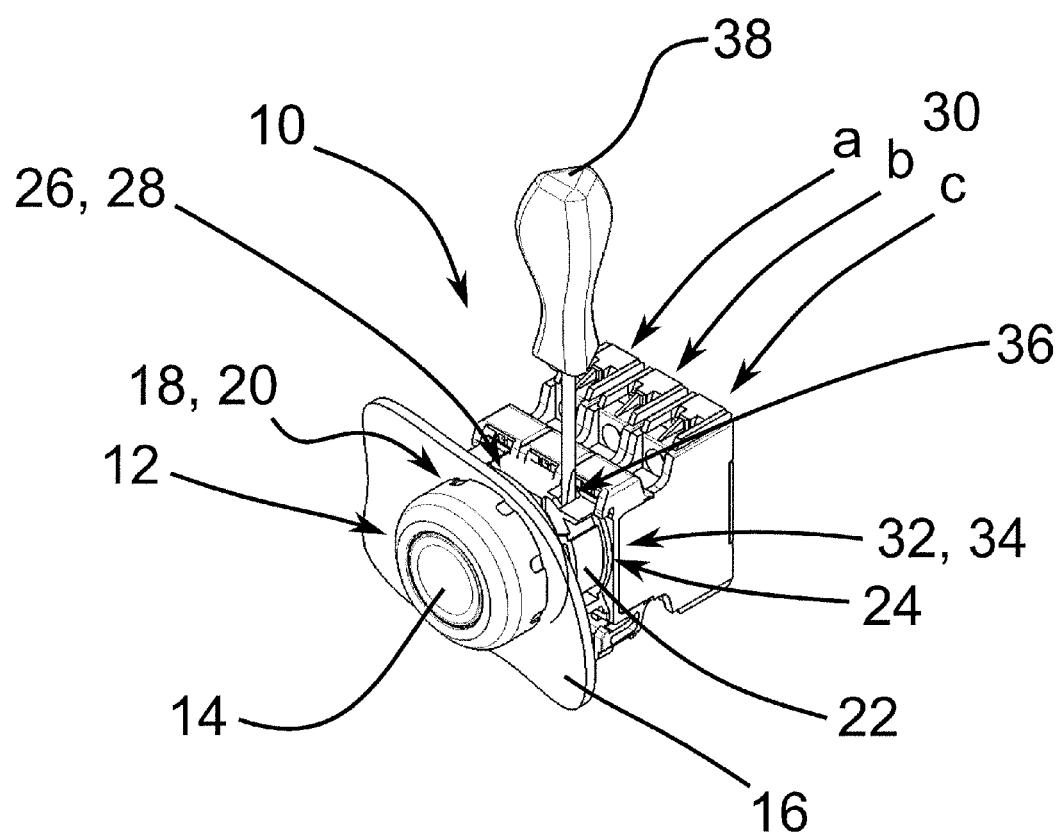
FIG. 1 is a perspective of a device in accordance with the invention mounted in an operating panel for providing commands and/or signals.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to the drawings, there is shown an illustrative device 10 in accordance with the invention for giving commands and/or signals. The device 10 in this case includes an attachment part 12 comprising a button insert part 14. The attachment part 12, as depicted in FIG. 1, is inserted into an operating panel 16 and has an external thread section secured to the operating panel 16 by means of a screw nut 18. For this purpose, the attachment part 12 includes a flange 20, which rests on a front side of the operating panel 16.

An adapter 22 is inserted into the attachment part 12, and for that purpose, the attachment part 12 and the adapter 22 have a plug-in coupling 24, a first coupling means 26 of which is arranged at the attachment part 12 and a second coupling means 28 of which is arranged at the adapter 22. Three contact elements 30a, 30b, 30c are fastened to the adapter 22. They in each case include two connecting clamps by which lines of an electrical installation can be connected to the contact elements 30. The central contact element 30b can also be replaced by a light element, the lamp of which lights up, for example, when operating the button 14 for illuminating the button 14. The adapter 22 is locked with the attachment part against a separating movement opposite to an axial direction A with the help of a locking device 32 and is connected to the attachment part 12 without play in or opposite to the axial direction A. The locking is secured by means of a catch lock 34. The adapter 22 includes an unlocking recess 36 into which a screwdriver 38 is inserted in the illustration. The catch lock 34 can be released by means of the screwdriver by pressure being exerted on a plug-in appendage, which then springs back due to its ability to bend. The plug-in coupling 24 can thus be unlocked between the attachment part 12 and the adapter 22. The attachment part 12 may be made of plastic, and as indicated above, may be formed with an external thread for enabling securement of the attachment part by means of the screw nut 18

Figure 2A:
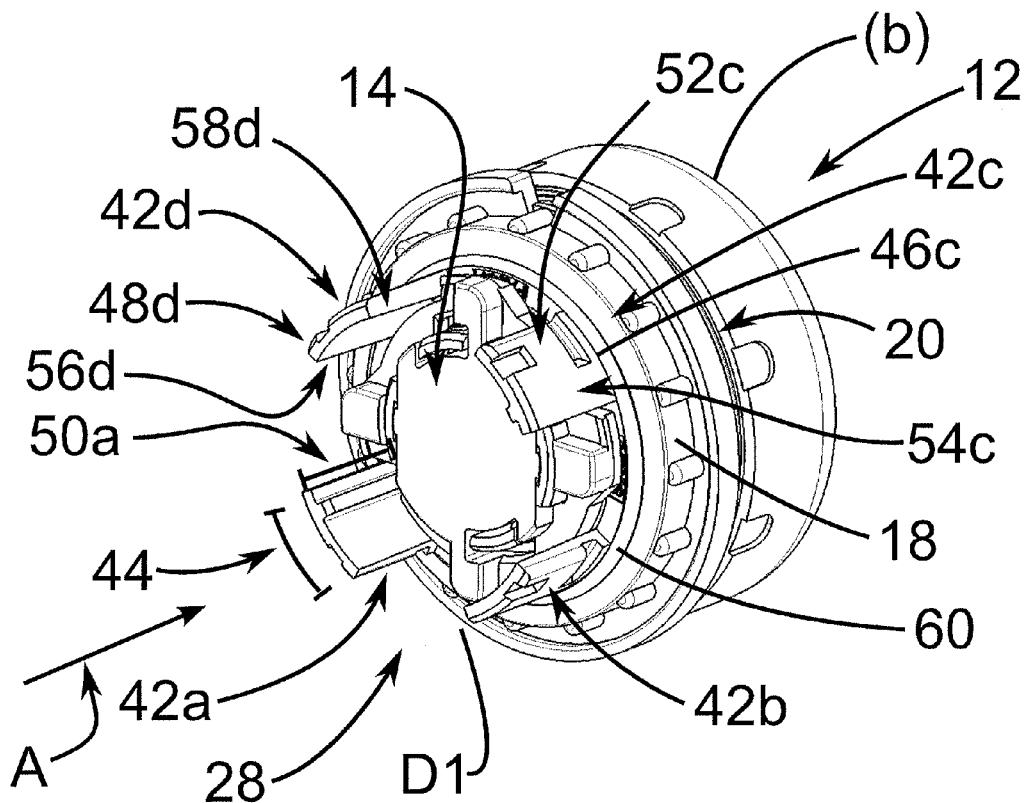
FIG. 2a is a rear perspective of the attachment part of the illustrated device.
Figure 2B:
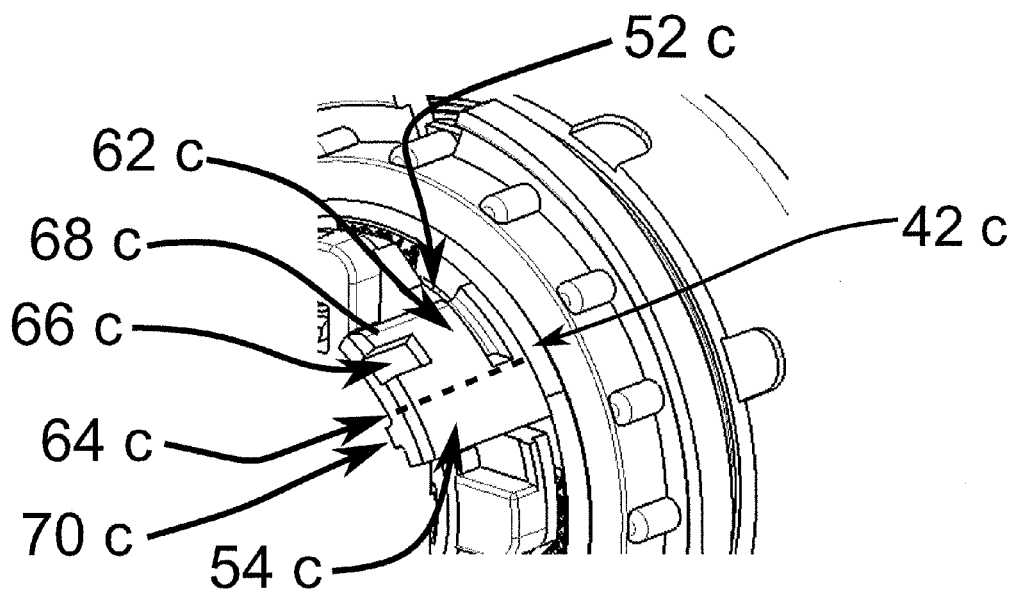
Figure 3:
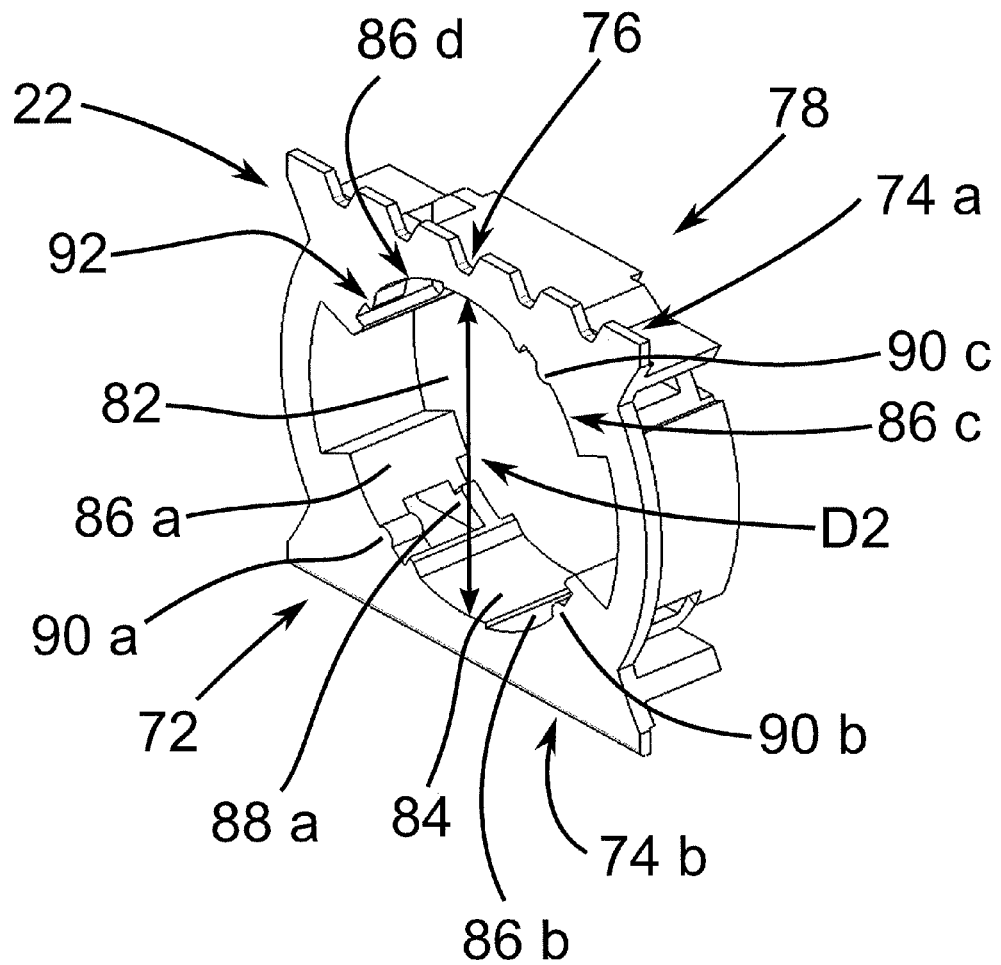
FIG. 3 is an enlarged perspective of an adapter of the device shown in FIG. 1.

The first coupling means 26 is part of the attachment part 12, that is, it is seamlessly connected thereto. As depicted in FIGS. 2a and 2b, four plug-in appendages 42a-d of the first coupling means 26 extend rearwardly or away from the attachment part 12 in the axial direction. For the sake of clarity, not all of the features, which are present several times at the first or second coupling means, respectively, are provided with reference numerals in FIGS. 1-4. The plug-in appendages 42a-d are ring segments, which are arranged on a common circumference at a first diameter D1 at the attachment part 12. Along the circumference, each plug-in appendage 42a-d defines a circumferential length 44 of a tenth of the total circumference. On one side, a plug-in appendage 42a-d includes a joint 46 to the remaining part of the attachment part 12 and a free end 48 axially on the opposite side. The length 50 of the plug-in appendages 42a-d along the axial direction A from the joint 46 to the free end 48 is matched to the adapter 22, as illustrated in FIG. 3. Each plug-in appendage 42a-d is divided into two imaginary sections 52a-d, 54a-d along a line, which runs along the axial direction A. Viewed from the free end 48a-d, the first section 52a-d is arranged at the first side 56a-d of the plug-in appendage 42a-d, which is oriented in counter-clockwise direction. The second section 54a-d is arranged at the second side 58a-d of the plug-in appendage 42a-d, which is oriented in clockwise direction. A circular edge-shaped first plug-in stop wall 60 is arranged at the joints 46a-d of the plug-in appendages 42a-d.

Each plug-in appendage 42a-d includes a respective locking web 62a-d, which is arranged transversely to the axial direction, comprising a locking surface oriented in axial direction and which is arranged in the first section 52a-d of the plug-in appendage 42a-d. This is illustrated in FIG. 2b for the plug-in appendage 42c representative for all of the plug-in appendages. The locking web 62a-d extends transversely to the axial direction A along the circumference of the ring segment-shaped plug-in appendage 42a-d. The locking web 62a-d extends from the first side 56a-d of the plug-in appendage 42a-d along the circumference to an imaginary boundary 64a-d between the sections 52, 54a-d of the plug-in appendage 42a-d. The first side 56a-d of the plug-in appendage forms a first rotary stop wall.

Each plug-in appendage 42a-d further includes an axial groove 66a-d, which extends parallel to the axial direction A. The axial groove 66a-d is open at the free end 48, that is, it is not limited by a stop. The axial groove 66a-d is arranged in the first section 52a-d of the plug-in appendage 42a-d. On the first side 56a-d of the plug-in appendage 42a-d, the axial groove 66a-d is limited by a catch web 68a-d of the first coupling means 26, which is a catch means.

Due to the selection of its material and its dimensions, such as in particular of its length and thickness as well as due to the one-sided connection in a direction transversely to the axial direction A, a plug-in appendage 42, in particular the first section 52a-d, which encompasses the axial groove 66a-d and the catch web 68a-d, has a flexible spring-like character. At the plug-in appendage 42, a longitudinal cross beam 70a-d can be arranged in the otherwise structurally free second section 54a-d so that the second section 54a-d is reinforced, while the resilience of the first section 52a-d is nonetheless substantially maintained.

As depicted in FIG. 3, the contact elements of the adapter 22 are fastened to a rear side 72 of the adapter 22. For this purpose, the adapter has a first or upper edge 74a and a second or lower edge 74b. The first edge 74a has V-shaped recesses 76. Claws arranged at the contact elements can engage with the V-shaped recesses 76 and around the second edge 74b.

In the illustrated embodiment, the adapter 22 is embodied in one piece as a rigid frame without movable parts. The adapter 22 preferably is made of plastic. When the device is assembled, the rear side of the adapter 72 faces the command and/or notification device. In addition, the adapter 22 has a front side 78 that faces the attachment part when the device is assembled. The front side 78 of the adapter 22 also serves the function of a second plug-in stop wall 78. A first plug-in stop wall at the attachment part and the second plug-in stop wall 78 form a plug-in stop, which defines the axial position of the attachment part and of the adapter 22. The frame of the adapter 22 includes a reach-through 82 from the rear side 72 through the front side 78 comprising an inner wall 84, which forms the second coupling means 28. The reach-through 82 is equipped to accommodate the plug-in appendages 42. For accommodating the plug-in appendages 42, a second diameter D2 of the reach-through 82 is matched to the first diameter D1 at which the plug-in appendages 42 are arranged. When the device 10 is assembled, one or a plurality of pins, which pass on the mechanical operation of the button to one or a plurality of contact elements, can furthermore reach or extend through the reach-through 82. Light also can pass through the reach-through 82 to illuminate the button.

An inner wall 84 of the reach-through 82 includes guide sections 86a-d, along which the plug-in appendages 42 are guided when attaching the adapter 22 to the attachment part 12. Four counter locking webs 88a-d comprising counter locking surfaces, which are arranged transversely to the reach-through direction, are arranged at the inner wall 84 as a surface structure thereof. In addition, rounded catch cams 90a-c are arranged at the inner wall 84 as the surface structure thereof. A detent 92 is furthermore arranged at the inner wall as the surface structure thereof. Finally, rotary stop webs 94a-d are arranged at the inner wall 84 as the surface structure thereof (see FIG. 4). The rotary stop webs 94a-d each include a wall, which forms a second rotary stop wall 96a-d. Each second rotary stop wall 96a-d extends from the rear side 72 to the front side 78 of the adapter in axial direction.

A counter locking web 88 is arranged in a section of the inner wall at the front side 78, but is spaced apart therefore to the axial direction. The counter locking web 88 extends from the second rotary stop wall 96a-d of the rotary stop web 94a-d transversely to the axial direction along the inner wall circumference to a guide section 86a-d. A detent 90a-c is a rounded web, which, starting at the rear side of the adapter 72, extends along the axial direction A. The catch cam 92 is a catch tooth comprising a tooth back 98, which rises diagonally in rotary locking direction, and a tooth face 100, which slopes steeply. Starting at the rear side of the adapter 22, the detent 92 extends along the axial direction A. A rotary stop wall 96a-d and a catch cam 90a-c or a detent 92, respectively, forms a catch groove 102. Catch cams 90 or detents 92, respectively, are counter catch means of the second coupling means 28. The adapter 22 or the inner wall 84, respectively, is the supporting element of the counter catch means.

Figure 4A:
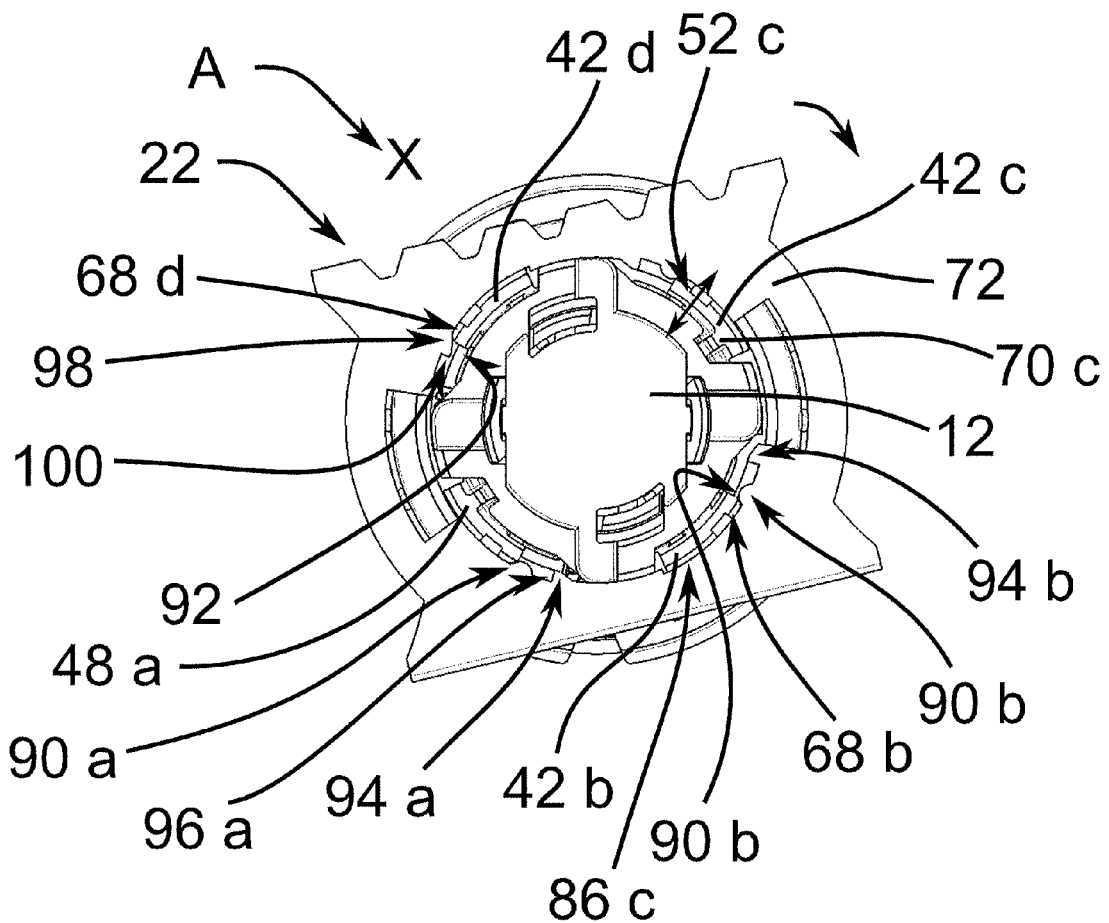
FIGS. 4a and 4b are rear views of the attachment part and adapter sequentially during engagement.
Figure 4B:
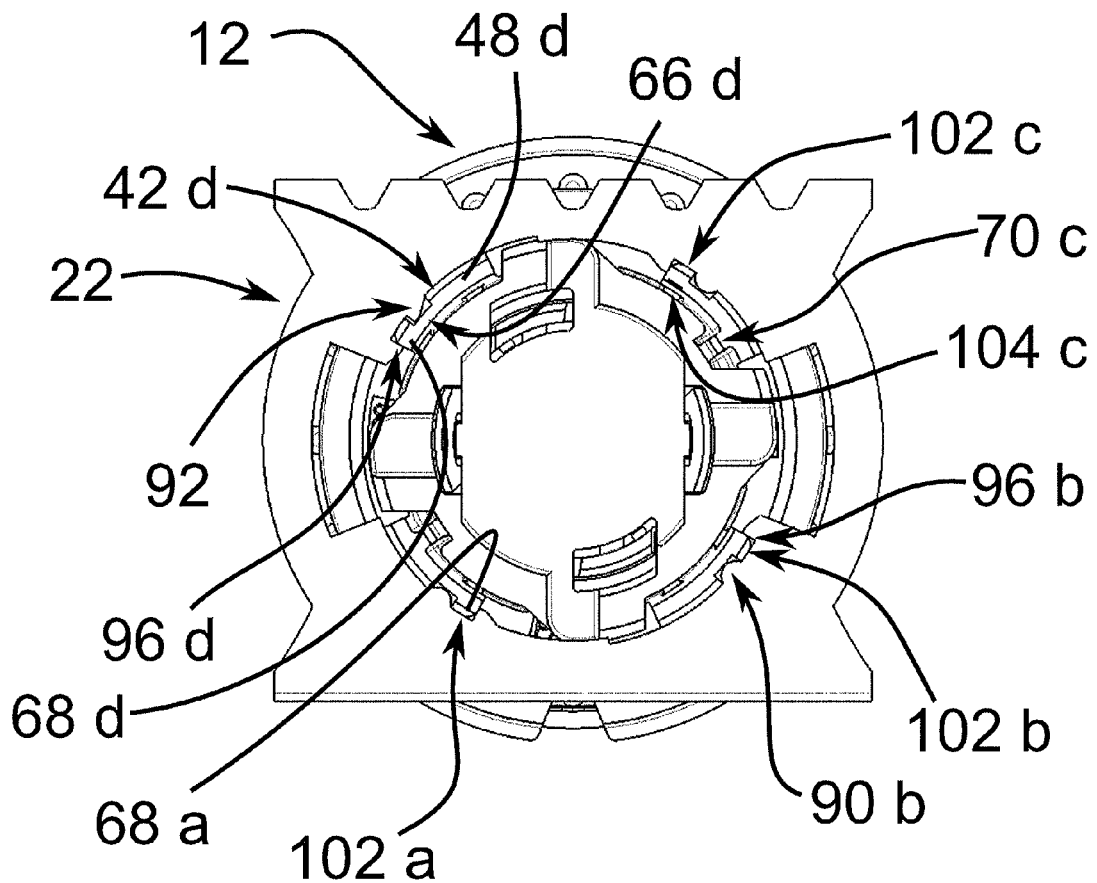

It is illustrated in FIG. 4 the manner by which the first coupling elements and the second coupling elements work together. FIG. 4a shows the adapter 22 attached to the plug-in appendages 42a-d along the guide sections 86a-d. The free ends 48a-d of the plug-in appendages 42a-d extend to the rear side 72 of the adapter 22. An excessive positioning and attaching is limited by the first plug-in stop wall of the attachment part and by the second plug-in stop wall of the adapter.

The counter locking webs are engaged with the locking webs by means of a relative rotation of the adapter 22 with reference to the attachment part 12 in clockwise direction, as is depicted in FIG. 4a by means of an arrow. At the adapter 22, the counter locking web and the locking web are in each case are axially arranged at each plug-in appendage 42a-d such that a coupling of the adapter 22 and of the attachment part 12 results, which is as free from play opposite to the axial direction A. As is indicated by means of an X, the axial direction A points in the paper plane of the drawing. In response to the rotation, the catch webs 68a-d of the plug-in appendages 42a-d slip across the rounded catch cams 90a-c or the back 98, respectively, of the detent 92. By means of the longitudinal cross beams 70a-d and the asymmetrical exertion of force due to the arrangement of the catch means 68a-d in the first section 52a-d, in particular the first sections 52a-d of the plug-in appendages 42a-d yield in a resilient manner transversely to the axial direction A, as is illustrated by means of the double arrow, representative for the plug-in appendage 42c. The locking rotation is limited by means of the second rotary stop wall 96a-d.

When the adapter 22 is attached to the attachment part 12 and is secured thereto, a catch web 68a-d is arranged between the catch cam 90a-c or the detent 92, respectively, and the second rotary stop wall 96a-d, which in each case form a catch groove 102a-d. The width 104a-d of the catch web 68a-d is preferably matched to the circumferential distance between the catch cam 90a-c or the detent 92, respectively, and the second rotary stop wall 96a-d such that the attachment part 12 and the adapter 22 are free from rotational play relative to one another when the catch web 68a-d is arranged in the catch groove 102a-d. In the arrangement of the adapter 22 on the attachment part 12 illustrated in FIG. 4b, the catch cams 90a-c, and at least the detent 92, together with the corresponding catch webs 68a-d, prevent an undesired rotary unlocking movement of the adapter 22 with reference to the attachment part 12. The catch lock, that is, in particular the catch cam 90a-c or the detent 92, respectively, does not absorb any forces opposite to the axial direction A at the end 48a-d of the plug-in appendage 42a-d due to the open end of the axial groove 66a-d. Forces opposite to the axial direction A are only absorbed by the locking webs 62 and counter locking webs, which are engaged with one another. The catch lock can be released in that the plug-in appendage 42d, with which the detent 92 engages, is bent away from the detent 92. As is illustrated in FIG. 1, this release movement can be carried out by means of a screwdriver 38 or the like, for example, which engages an unlocking recess 36, which is arranged in the adapter 22 and which allows the plug-in appendage 42d to be accessed from the outside. The catch lock of a device, which differs from the embodiment according to FIG. 4 in that the detent 92 is replaced by means of a round catch cam 90, can be equipped, for example, to be releasable by means of a rotary unlocking movement by overcoming a release torque.

Figure 5:
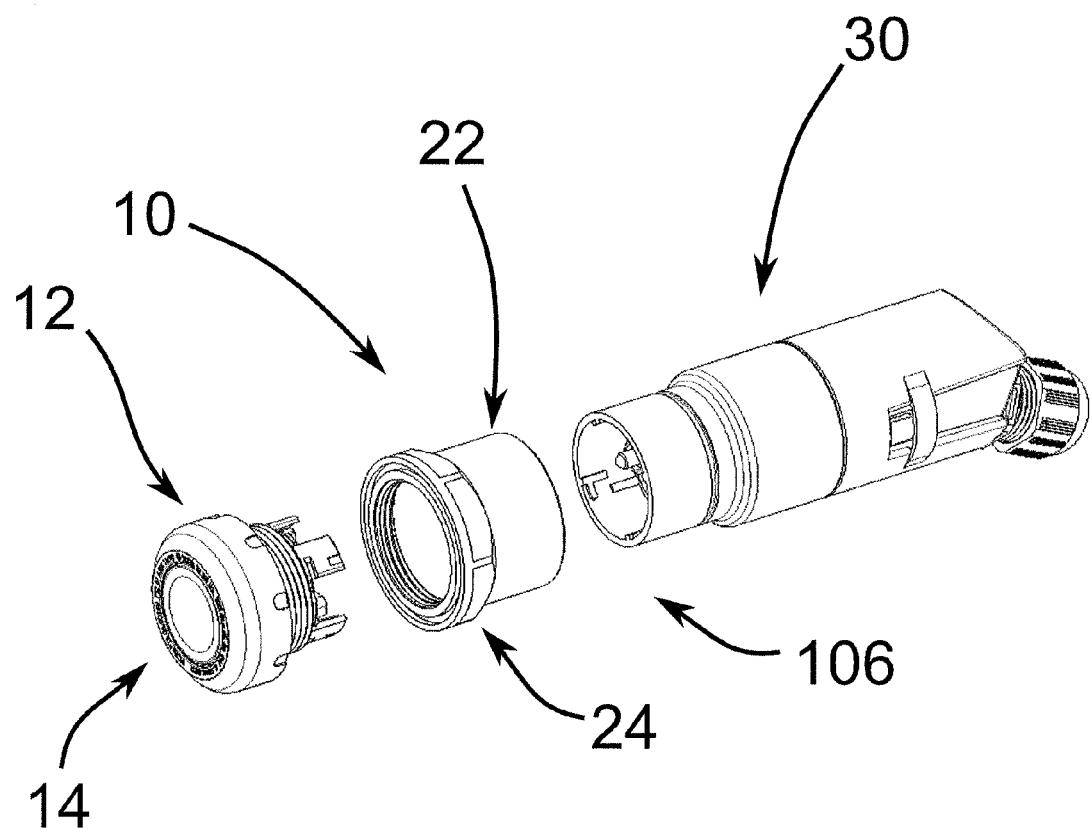
FIG. 5 is an exploded perspective of a complete device comprising an attachment part, adapter, and command device.

FIG. 5 shows a different embodiment of a device 10 according to the invention comprising an attachment part 12, an adapter 22 and a command device 30, wherein the command device 30 is embodied as a complete device 30, which includes the electrical installation by means of the button 14. In addition to the plug-in coupling 24 for locking the attachment part 12 with the adapter 22, the device 10 encompasses a further connection device 106, by means of which the adapter 22 and the complete device 30 can be connected.

| List of Reference Numerals: | |
|---|---|
| 10 | device |
| 12 | attachment part |
| 14 | button insert part |
| 16 | operating panel |
| 18 | screw nut |
| 20 | Flange |
| 22 | Adapter |
| 24 | plug-in coupling |
| 26 | first coupling means |
| 28 | second coupling means |
| 30 | command or notification device/complete device |
| 32 | locking device |
| 34 | catch lock |
| 36 | unlocking recess |
| 38 | Screwdriver |
| 42 a-d | plug-in appendages |
| 44 a-d | circumferential extensions |
| 46 a-d | Joints |
| 48 a-d | free ends |
| 50 a-d | lengths of the plug-in appendages |
| 52 a-d | first sections |
| 54 a-d | second sections |
| 56 a-d | first sides |
| 58 a-d | second sides |
| 60 | first plug-in stop wall |
| 62 a-d | locking webs |
| 64 a-d | boundary between the first and second section |
| 66 a-d | axial grooves |
| 68 a-d | catch webs |
| 70 a-d | longitudinal cross beams |
| 72 | rear side of the adapter |
| 74 a, b | first and second edge |
| 76 | v-shaped recess |
| 78 | front side of the adapter/second plug-in stop wall |
| 82 | reach-through |
| 84 | inner wall |
| 86 a-d | guide sections |
| 88 a-d | counter locking webs |
| 90 a-c | catch cams |
| 92 | detent |
| 94 a-d | rotary stop web |
| 96 a-d | second rotary stop walls |
| 98 | tooth back |
| 100 | tooth face |
| 102 a-d | catch grooves |
| 104 a-d | widths of the catch webs |
| 106 | connection device |
| A | axial direction |
| D1 | first diameter |
| D2 | second diameter |

The invention claimed is:

1. A device (10) for providing commands and/or signals comprising:
an attachment part (12),
an adapter (22), and
at least one command and/or notification device (30),
a plug-in coupling (24) for connecting the adapter (22) to the attachment part (12), said plug-in coupling (24) including a first coupling element (26) having a plug-in appendage (42) and a second coupling element (28), said plug-in coupling (24) defining an axial direction (A) of relative movement of the first and second plug-in elements (26)(28),
a locking device (32) having a locking surface (62) on the first coupling element (26) oriented transversely to the axial direction (A), said second coupling element (28) having a counter locking surface (88) oriented transversely to the axial direction (A),
said locking surface (62) and the counter locking surface (88) being arranged such that they can be brought into and out of engagement with one another by means of the relative rotation of the adapter (22) and the attachment part (12) about the axial direction (A),
a catch lock (34) comprising a catch (68) arranged on the plug-in appendage (42) and a counter catch (90, 92) that cooperates with the catch (68),
said catch (68) and the counter catch (90, 92) being movable into engagement by relative rotation of the adapter (22) and the attachment part (12) to one another about the axial direction (A) for locking the attachment part (12) in place.

2. The device of claim 1 in which the locking surface (62) of the first coupling element (26) is formed by a locking web (62) oriented transversely to the axial direction (A) and arranged on the first coupling element (26).

3. The device (10) of claim 2 in which the counter locking surface (88) of the second coupling element (28) is formed by a counter locking web (88) oriented transversely to the axial direction (A) and arranged on the second coupling element (28).

4. The device (10) of claim 1 in which said plug-in appendage (42) is resilient and has a free end (48) upon which the catch (68) is disposed.

5. The device (10) of claim 1 in which the catch and/or counter catch is defined by one of a catch web (68), a rounded catch cam (90), or a detent (92).

6. The device (10) of claim 1 in which said catch lock (34) is free of exposure to axial forces in the axial direction A when the attachment part is locked in place.

7. The device (10) of claim 2 in which the locking web (62) is arranged on the plug-in appendage (42).

8. The device (10) of claim 1 in which the coupling elements (26, 28) are part of the adapter (22).

9. The device (10) of claim 3 in which one of the locking webs (62) and counter locking web (88) and one of the catch (68) and counter catch (90, 92) are part of the adapter (22).

10. The device (10) of claim 1 in which one of the adapter (22) and attachment part (12) includes an unlocking recess (38).

11. The device (10) of claim 1 in which the plug-in coupling (24) includes a plug-in stop (60, 72).

12. The device (10) of claim 1 in which said plug-in coupling (24) includes a rotary stop (56, 96).

13. The device (10) of claim 1 in which said plug-in appendage (42) is resilient, and said catch lock (34) includes a detent (92) and corresponding catch (68) or counter catch (68, 92), and said detent (92) and corresponding catch (68) or counter catch (68, 92) are engageable and disengageable by means of a bending movement of the plug-in appendage (42).

14. The device (10) of claim 1 in which said plug-in appendage (42) has a first section (52) and a second section (54), and said second section (54) has a longitudinal cross beam (70) for reinforcing the second section (54).

15. The device (10) of claim 2 in which the catch lock (34) includes rounded catch cams (90) that are engageable by the catch web (68).

* * * * *